United States Patent [19]

Wolfe

[11] 4,087,941
[45] May 9, 1978

[54] WINDOW ASSEMBLY
[75] Inventor: Robert W. Wolfe, Fullerton, Calif.
[73] Assignee: Coleman Mfg. Co., Anaheim, Calif.
[21] Appl. No.: 774,438
[22] Filed: Mar. 4, 1977
[51] Int. Cl.² .............................................. E05D 13/06
[52] U.S. Cl. ........................................ 49/450; 49/453;
160/381; 403/295; 403/402
[58] Field of Search ................. 49/450, 453, 451, 382,
49/388; 160/381; 403/402, 295

[56] References Cited
U.S. PATENT DOCUMENTS

| 1,241,794 | 10/1917 | Watson | 160/381 X |
|---|---|---|---|
| 1,922,009 | 8/1933 | Axe | 49/450 X |
| 2,704,573 | 3/1955 | Russell | 49/453 X |
| 2,965,935 | 12/1960 | Olsen | 49/450 |
| 3,377,747 | 4/1968 | Donkin | 49/450 X |
| 3,629,972 | 12/1971 | Rehberg et al. | 49/382 X |

Primary Examiner—Philip C. Kannan
Attorney, Agent, or Firm—Gary Appel

[57] ABSTRACT

A window assembly including parallel opposing tracks with a window having an overall width slightly smaller than the width between the leading edge of the tracks, the window being constructed of channel material interconnected at the corners by angle members, a first pair of angle members having inserted therein fixed pivot pins. The second pair of opposing angle members has assembled therein spring loaded latching members having projections adapted for engaging slots within the tracks.

3 Claims, 5 Drawing Figures

WINDOW ASSEMBLY

BACKGROUND OF THE INVENTION

The background of the invention will be discussed in two parts:

1. Field of the Invention

This invention relates to windows and more particularly to a sliding window construction.

2. Description of the Prior Art

Double hung windows are commonly used in the construction of residences, and with the increasing volume of mobile home construction and recreational vehicles, aluminum channels and extrusions have become commonly employed to construct the window frames and the window sashes.

In double hung windows, two pairs of parallel tracks are formed within the window frame with a pair of window sashes being suitably secured for operation within the tracks. One of the problems inherent in the double hung windows relates to the lack of removability of such windows to facilitate the replacement, repair of cleaning.

Examples of various window constructions are shown in U.S. Pat. No. 3,122,797; 3,796,009; 3,837,118; and 3,908,730. The window constructions of the last two above mentioned patents relate to storm windows for single or double hung windows where the problem of removability of the window is especially important.

Such prior art window constructions often times include pre-positioned aligned cutouts within a portion of a trackway to facilitate removal of the windows as shown in U.S. Pat. No. 3,122,797. In U.S. Pat. No. 3,837,118 the trackway, at least for one edge of the sash, is of a depth sufficient for insertion of the edge of the window sash into the trackway to the full depth of thus permitting the other edge to be aligned with the opposing trackway and then appropriately centered by means such as spring loaded plungers which operate against the trackway to maintain the centered position. Another example of this type of structure is shown in U.S. Pat. No. 3,908,730.

Such prior art window constructions do not provide the most efficient and economical assemblies from a cost, construction, assembly or ease of removal basis.

Accordingly, it is an object of this invention to provide a new and improved window construction.

It is another object of this invention to provide a new and improved construction which is easy to manufacture and easy to assemble and disassemble.

SUMMARY OF THE INVENTION

The foregoing and other objects of the invention are accomplished by providing a window construction having a window frame with two pairs of parallel opposing trackways, one of the trackways defining a shorter overall opening. Each window frame is constructed of mitered channel members secure by two pairs of angle members, one pair of angle members being adapted to receive adjacent channel members to form opposing corners and to fixedly secured thereto pivot projections. The other pair of angle members has one arm thereof configured to receive therein a spring and plunger assembly, the plunger being provided with a projection adapted to extend into the trackway for guiding the window sash and adapted for engaging slots formed within the trackway to lock the window sash in position. The window sash is so-dimensioned that removal from the frame is accomplished by depressing the plungers against the force of the spring, pivoting the sash about an axis defined by the pivot projections and displacing this axis at an angle to the track to remove the sash from the frame.

Other objects, features and advantages of the invention will become apparent from a reading of the specification when taken in conjunction with the drawings in which like reference numerals refer to like elements in the several views.

BRIEF DESCRIPTION OF THE PREFERRED EMBODIMENT

Figure 1:
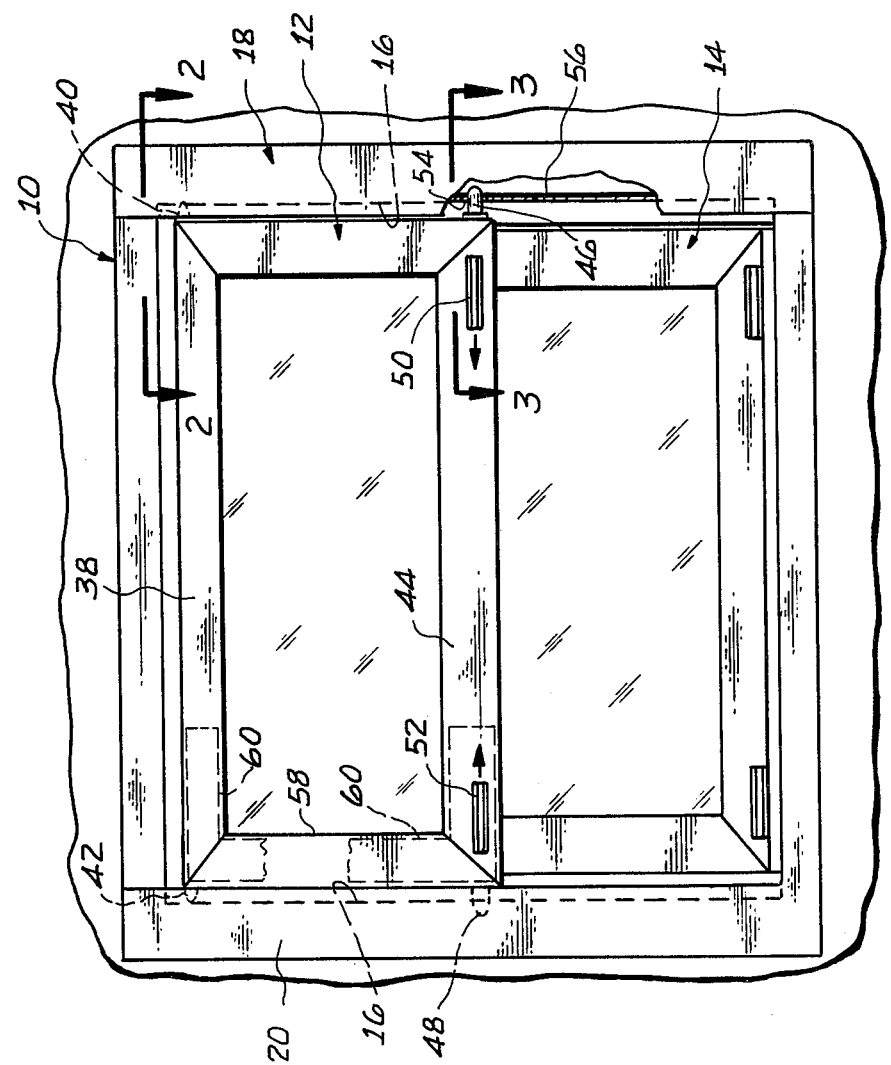
FIG. 1 is a vertical elevation of the window assembly according to the invention, partially broken away.

Referring now to the drawings and particularly to FIG. 1, there is shown a window construction according to the invention, the construction including a square or rectangular frame generally designated 10 having an upper sash 12 and a lower sash 14 slidably secured therein for movement in a vertical direction as viewed in FIG. 1. Although the description with respect to the window construction will proceed with respect to sliding of the sashes 12 and 14 vertically, it is to be understood that the window construction arrangement is equally applicable to a window construction wherein the sashes are mounted for sliding in a horizontal direction.

Figure 2:
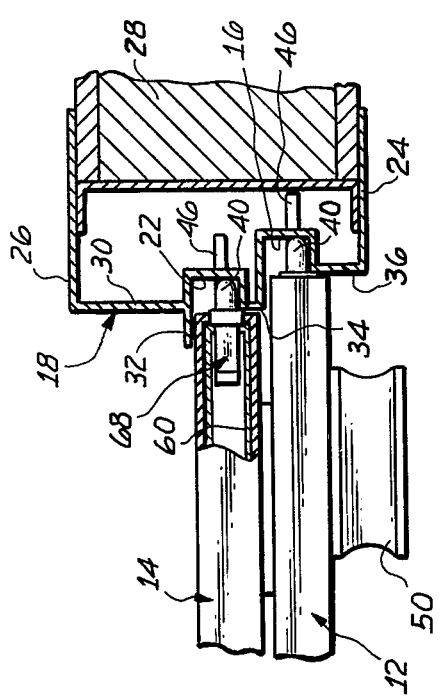
FIG. 2 is a cross-sectional view taken generally along line 2—2 of FIG. 1.
Figure 3:
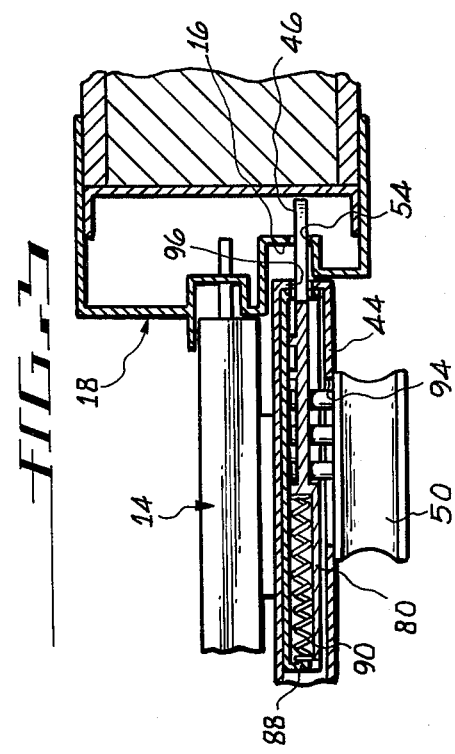
FIG. 3 is a cross-sectional view taken generally along line 3—3 of FIG. 1.

Referring also to FIGS. 2 and 3, the window sash 12 is adapted to slide in vertically extending trackway 16 which is formed within the vertical edges 18 and 20 of frame 10. Parallel with trackway 16 is a second trackway 22 adapted to slidably receive sash 14, the trackways 22 and 16 being parallel to each other and being formed of opposing identically configured portions in the opposite frame 20. As can be seen in FIGS. 2 and 3, trackway 22 is offset inwardly from trackway 16 to define a smaller opening between opposing track portions of trackway 22. The vertical frame portion 18 can be an extruded aluminum channel member having opposite parallel edges 24 and 26 adapted for securing to a suitable wall 28 or the like. Interconnecting the edges 24 and 26, from top to bottom as viewed in FIGS. 2 and 3, is a perpendicular web portion 30 with a generally U-shaped section forming trackway 22, this section having a lip portion 32 extending generally parallel to the sash 14 and in proximate location thereto, the lip 32 facing the outdoors with respect to the construction panel 28. Intermediate trackways 22 and 16 is an interconnecting portion having an edge 34 in spaced proximate relation to the vertical edge of the sash 14. Similarly, the generally U-shaped trackway 16 has an edge 36 in spaced proximate relation to the edge of sash 12, the edges 34 and 36 being generally perpendicular to the opposing parallel edges 24 and 26 of the frame 18 and generally parallel to each other.

As can be seen, the overall width of each of the sashes 12 and 14 is slightly less than the spacing between opposing edges 36 and 34, respectively. Referring again to FIG. 1, the upper cross member 38 of sash 12 has affixed to the outer edges thereof projections 40 and 42, respectively, which define a line or axis adjacent to the upper edge of cross member 38 and parallel to the edge, the projections 40 and 42 being adapted to engage the bight portion of trackway 16 for slidable and pivotal movement therein. The other cross member 44 is similarly provided with opposing projections 46 and 48 which are portions of a plunger assembly, which will hereinafter be discussed, operated by handles 50 and 52 suitably mounted within slots in cross member 44. The projections 46 and 48 are spring-biased outwardly along a given line parallel to the lower edge of cross member 44 and are adapted to fit within slots 54 and 56 formed in the bight portion of trackway 16. The slot 54 is located in a position where sash 12 is fully raised or closed with slot 56 being suitably located along trackway 16 to enable the sash 12 to be locked within frame 10 with the sash 12 in an opened position thus allowing ventilation and security. Although only two slots are shown it is to be understood that each slot 54 and 56 has a corresponding aligned slot in the opposing trackway 16 and more than two slots may be advantageously positioned to allow differing amounts of opening of sash 12. It is also to be understood that sash 14 is similarly configured with respect to trackway 22 to allow opening and latching in various locations.

As shown in dotted lines in FIG. 1, the cross member 38 is coupled to a vertical member 58 at the mitered corner thereof by means of a suitable angle member 60 and similarly vertical member 58 is coupled to cross member 44 by means of a second angle member 60. In both instances, the angle members 60 are identical but receive different components after or during assembly as will hereinafter be discussed.

Figure 4:
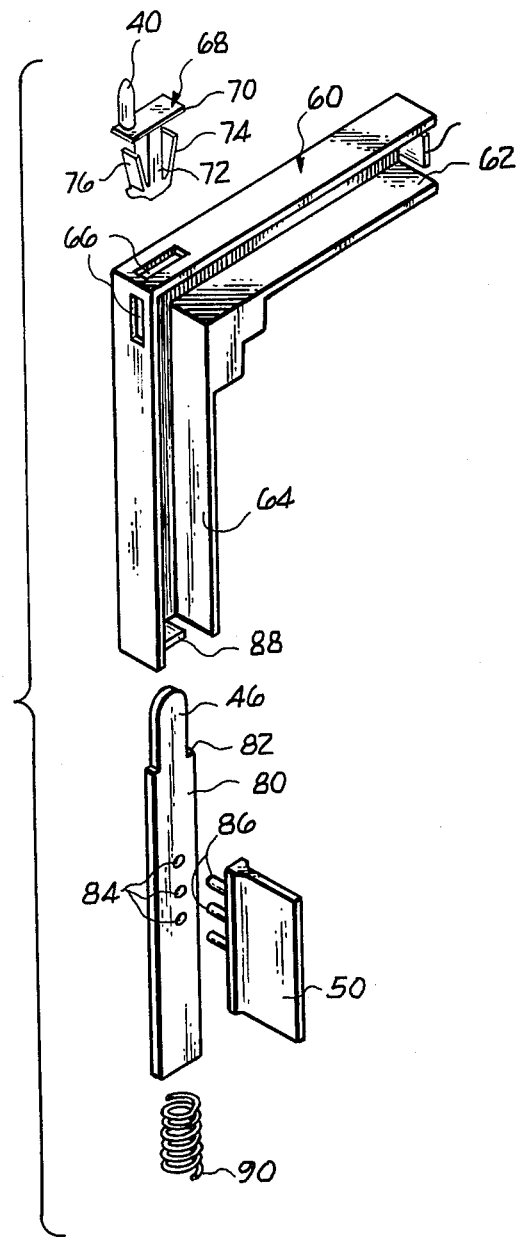
FIG. 4 is an exploded perspective view of an angle member and the elements adapted to be connected thereto.

Referring now to FIG. 4, the angle member 60 is generally L-shaped with a generally C-shaped cross section in each of the legs 62 and 64. In the wall of angle member 60 in general alignment with legs 62 and 64, slots 66 are formed. Slot 66 is adapted to receive one of two members. If the angle member 60 is used to connect the upper cross member 38 to the interconnecting member 58 of window sash 12, the slot 66 receives the pivot projection member 68 which is a one-piece plastic member having a planar flange 70 with projection 40 formed integral therewith and perpendicular thereto. Extending in the opposite direction from flange 70 is a body member 72 having upwardly diverging deformable tangs 74 and 76. During assembly of the interconnecting member 58 to the leg 62 of angle member 60 the interconnecting member 58 is suitably cut out to expose slot 66 and pivot projection member is then inserted therein until body member 72 passes through slot 66 with tangs 74 and 76 being deformed during the insertion and then deflecting outwardly to the position shown in FIG. 4 to engage the surface of leg 62 opposite aperture or slot 66 thereby retaining pivot projection member 68 in place.

Alternatively, if the angle member 60 is utilized to interconnect the lower cross member 44 to the interconnecting member 58 of window 12, the pivot projection member 68 is not employed and inserted within the channel of leg 64 of angle member 60 is a plunger 80 which is generally bar-shaped in form terminating in a reduced cross section projection 46 previously discussed. The projection 46 has an overall dimension slightly smaller than slot 66 and is inserted therethrough with the shoulder 82 adapted to abut against the inner surface of slot 66. Centrally disposed in the body of plunger 80 are a plurality of apertures 84 which are adapted to receive friction grip projections 86 of the handle member 50.

Disposed centrally within the channel adjacent the free end of leg 64 is a generally I-shaped projection 88 formed integrally within the channel and being generally aligned and opposing the slot 66, the projection 88 being adapted to butt against one end of a compression spring 90, the other end of compression spring 90 inserted into one end of plunger 88 with projection 46 thereof extending through slot 66.

Referring also to FIG. 3, the plunger assembly is shown in its assembled condition with the construction occurring in the following sequence. The plunger 80 is inserted within the channel of leg 64 with the projection 46 thereof extending through slot 66. The spring 90 is then positioned with one end engaging projection 88 and the other end thereof inserting into plunger 80 to bias it normally outwardly with shoulder 82 engaging the inner edges of aperture 66. The cross member 44 which is generally hollow is then press fit over leg 64 and as can be seen in FIG. 3, the cross member 44 is provided with a suitable elongate slot 94 in alignment with the apertures 84 of plunger 80. The handle 50 is then press fit so that self-locking projections 86 engage the apertures 84 and are secured thereto. Correspondingly, the interconnecting member 58 is suitably slotted at 96 to permit passage therethrough of projection 46 into trackway 16 and through slot 54 formed therein.

By use of a common angle member 60 suitably configured to receive one or the other pivot projection members 68 or plunger 80, the number of components required to be kept on stock to assemble the window sashes are reduced. With the window sash 12 mounted within frame 10 as shown in FIG. 1, the operation is as follows. With the pivot projections extending outwardly from cross member 38 and abutting against the bight portion of trackway 16, the adjacent edge of the interconnecting member is in spaced proximate relation to edge 36 (see FIG. 2). In the closed position, the projections 46 and 48 extend into slots 54 (only one of which is shown) to lock the sash 12 in position. To slide the sash 12 downwardly as viewed in FIG. 1, the handles 50 and 52 are operated inwardly toward each other against the force of the bias springs 90 unitl the outer free edge of projection 46 clears the bight portion of trackway 16, thus enabling the sash 12 to be lowered within the frame 10. During the traversal of the sash 12 along trackway 16 intermediate adjacent slots the handles 50 and 52 can be released with the spring 90 urging the plunger 80 outwardly so that the edge of projection 46 abuts against the bight portion of trackway 16 until the next slot 56 is reached at which point the springs 90 urge the plunger 80 outwardly until projections 46 and 48 pass through slots 56. During this sliding movement the proximate location of the edges of the interconnecting members to the edges 36 assist in the guiding of the window to maintain a generally horizontal alignment of cross members 38 and 44 as viewed in FIG. 1.

Figure 5:
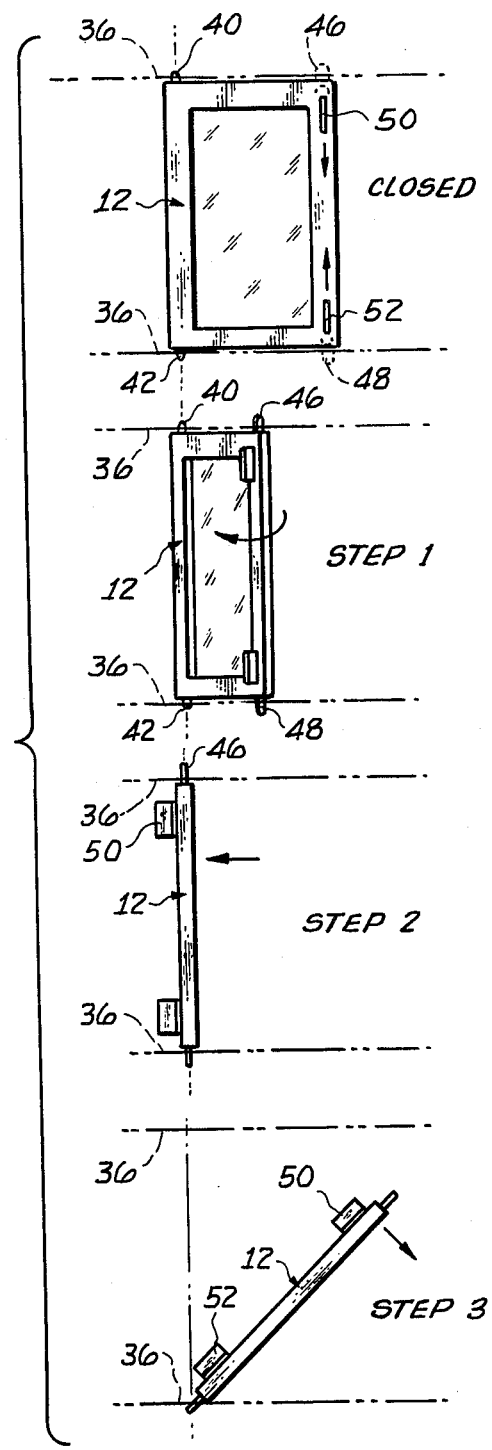
FIG. 5 is a diagramatic view illustrating the steps required to remove a window sash.

To remove either of the sashes 12 or 14 from their respective trackways 16 and 22, attention is directed to FIG. 5 in which a sash 12 is illustrated, for discussion purposes, as being slidable in a horizontal direction rather than the vertical direction of FIG. 1. In any event, the horizontal broken lines 36 in each of the illustrations of FIG. 5 are with reference to the edges 36 in spaced proximate relation to the outer edges of sash 12 and as can be seen in FIG. 5, the overall spacing between broken lines 36 is slightly greater than the overall distance between the adjacent edges of sash 12. In the upper illustration, the sash 12 is shown in its closed position with projections 46 and 48 passing outside the limits of broken lines 36. For step 1, the handles 50 and 52 are directed inwardly toward each other until the outer free edges of plunger projections 46 and 48 are within the dimensions established by the opposing edges 36. This is accomplished (see FIG. 3) by the dimension of slots 94 in channel 44 and the dimensions of the plunger assembly in general. Again referring to step 1 of FIG. 5, the sash 12 is pivoted about an axis defined by fixed projections 40 and 42, that is about a vertical axis as illustrated until step 2 is reached with the sash 12 being approximately perpendicular to the plane of the illustration. As illustrated in step 3, the axis defined by the fixed projections 40 and 42 is then rotated with respect to the window frame opening defined by the opposing parallel edges 36 to effect removal of the sash 12. It is to be emphasized, with reference to FIG. 4 that the fixed projection 40 of pivot projection member 68 is offset from the main axis of body portion 72 thereof so that the location of pivot projection 40 is very near the edge of the corner of window 12 to facilitate the removal thereof.

Of course, sash 14 would be identically configured except that the overall dimensions would be smaller to accomodate the reduced width between opposing trackways 22. The offset of the parallel trackways 22 and 16, in addition to facilitating the removal of both sashes 12 and 14, also assist in providing a relatively weather tight seal without the need for sealing materials attached to either the frame or the sashes. A circuitous path is provided from the exterior of the window construction to the interior by offsetting the respective trackways. While there has been shown and described a preferred embodiment, it is to be understood that various other adaptations and modifications may be made within the spirit and scope of the invention.

What is claimed is:

1. A window assembly comprising:

a generally rectangular frame defining an opening, said frame having parallel opposing inwardly directed generally U-shaped trackways, the ends of the arms thereof defining guiding edges within said opening;

a generally rectangular window sash having first, second, third and fourth window sash members with each of said window sash members having a generally rectangular hollow cross section interconnected at the corners by substantially identical angle members with said first and second members in parallel with an overall dimension between the edges thereof slightly smaller than the spacing between said guiding edges, each of the angle members being generally L-shaped and having a first leg and a second leg with each of said legs having a general cross section adapted for insertion within the hollow members, the angle member having a channel formed within at least one of the legs and slot means in the outer wall of the other leg in alignment with said channel;

a pair of pivot projection members, each having a body portion insertible within said slot means for retention thereby and a pivot projection, said pivot projection members being secured to one end of said first and second window sash members with the outwardly extending pivot projections in alignment with the free ends thereof abutting the bight portions of said trackways;

a pair of plunger assemblies mounted within said angle members in aligned relation adjacent the other ends of said first and second window sash members, each of said plunger assemblies having a spring-biased plunger slidably mounted within the channel of said at least one leg of said angle member with said plunger having a projection extending through said slot means of said angle member and outwardly from said window sash; and a plurality of pairs of aligned apertures formed in the bight portions of said trackways for selective engagement by said plunger projections for latching said sash within said frame, said fixed pivot projections and said plunger projections being aligned and configured to engage the bight portions of said trackways to enable said sash to slide within said trackways with said guiding edges in spaced proximate relation to said first and second window sash members, said plunger projections being retractable to enable said sash to be removed.

2. The combination according to claim 1 wherein said plungers are bar-shaped and said aligned apertures are slots.

3. In a window sash of the type having four members connected together to define a generally rectangular opening for receiving glass or the like, each of the members having a generally hollow rectangular cross section, interconnecting means comprising:

a generally L-shaped angle member having a first leg and a second leg, each of said legs having a general cross section adapted for insertion within said hollow members;

channel means formed within at least one of said legs, slot means in the outer wall of said other leg in alignment with said channel means;

a fixed pivot projection member having a body portion insertable within said slot means for retention thereby; and a plunger assembly, including a plunger slidably mountable within the channel of said at least one leg, said plunger having a projection adapted for extending through said slot whereby said angle member can be used for all four corners of said window sash with one of said pivot projection members and said plunger assembly operatively connected thereto to form a window having a pair of aligned fixed pivot projections and a pair of aligned movable projections.

* * * * *